United States Patent
Sterner et al.

(10) Patent No.: US 9,033,369 B2
(45) Date of Patent: May 19, 2015

(54) HOLDING COVERS FOR SEAT BELT ATTACHMENT

(75) Inventors: Jonas Sterner, Alingsas (SE); Peter Lundgren, Trollhattan (SE); David Prentkowski, Sterling Heights, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/348,944

(22) PCT Filed: Oct. 31, 2011

(86) PCT No.: PCT/US2011/058548
§ 371 (c)(1),
(2), (4) Date: Apr. 1, 2014

(87) PCT Pub. No.: WO2013/066288
PCT Pub. Date: May 10, 2013

(65) Prior Publication Data
US 2014/0237776 A1 Aug. 28, 2014

(51) Int. Cl.
*A44B 11/25* (2006.01)
*B60R 22/18* (2006.01)

(52) U.S. Cl.
CPC ......... *A44B 11/2561* (2013.01); *A44B 11/2553* (2013.01); *B60R 2022/1812* (2013.01); *B60R 22/18* (2013.01); *B60R 2022/1806* (2013.01)

(58) Field of Classification Search
CPC ........... A44B 11/2553; A44B 11/2561; A44B 11/2576; A44B 11/2546; A44B 11/2534; B60R 2022/1812
USPC ............ 280/806, 801.1, 808, 807; 24/579.11, 24/593.1, 163 R, 650, 197; 297/480, 482, 297/468, 483
See application file for complete search history.

(56) References Cited

U.S. PATENT DOCUMENTS 4,181,832 A * 1/1980 Ueda ...................... 200/61.58 B

FOREIGN PATENT DOCUMENTS

GB 2265663 A * 10/1993

* cited by examiner

*Primary Examiner* — Keith Frisby
(74) *Attorney, Agent, or Firm* — Brinks Gilson & Lione

(57) ABSTRACT

A fixing buckle assembly for use as part of a motor vehicle seatbelt restraint system of a type having webbing for positioning on an occupant and a lap pretensioner for pretensioning the seatbelt restraint system. The buckle assembly includes a tongue, preferably affixed to a pyrotechnic lap pretensioner (PLP). The buckle assembly includes a buckle plate featuring an aperture for connection to a loop of the webbing. A cover assembly encases the internal components of the buckle assembly and is formed of two cover halves which are preferably injection molded and snap together in a clam-shell construction. Each of the cover halves have sections which circumscribe a tongue passageway such that after they are assembled and the tongue is inserted in the buckle assembly, the cover halves become interlocked together. At the opposite end of the buckle assembly, the cover halves each include a section extending from the aperture which is retained from separation by being enclosed by the webbing loop. These features prevent separation of the housing halves upon activation of the PLP.

11 Claims, 4 Drawing Sheets

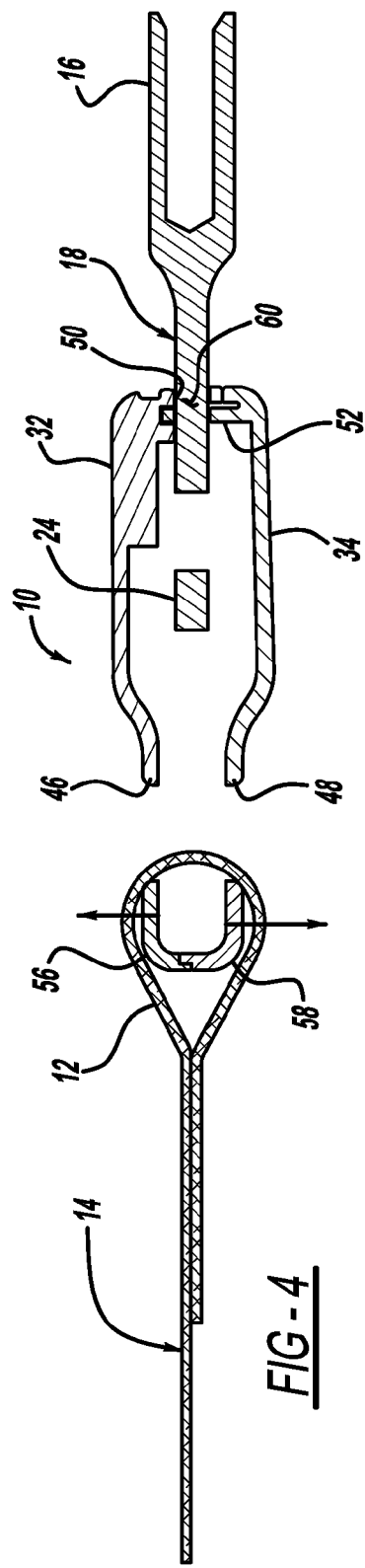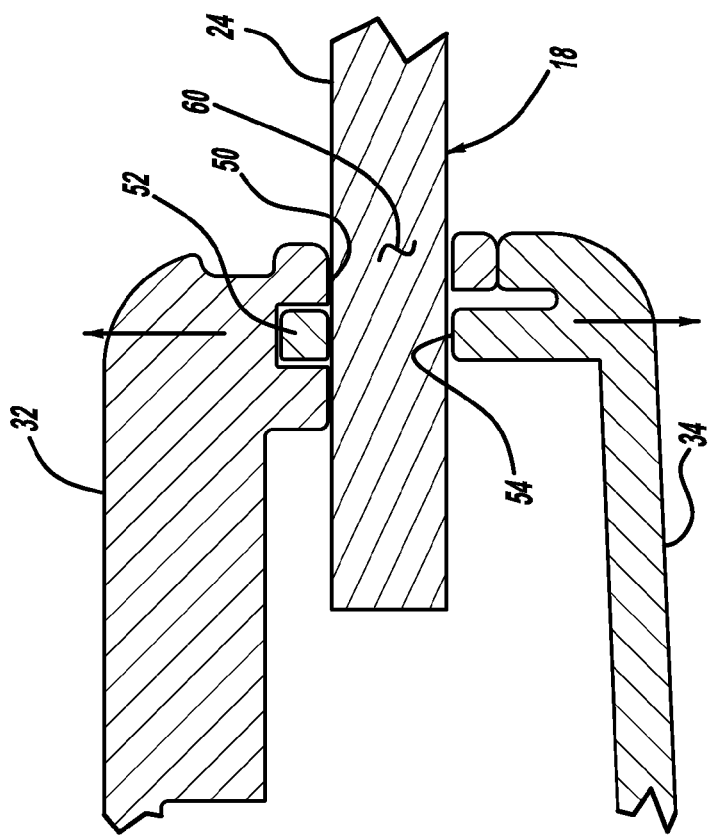
FIG-4
FIG-5

HOLDING COVERS FOR SEAT BELT ATTACHMENT

CROSS-REFERENCE TO RELATED APPLICATIONS

This application claims priority to PCT International Application No. PCT/US2011/058548, filed Oct. 31, 2011.

FIELD OF THE INVENTION

The present invention relates generally to seat belt restraint systems for motor vehicles and more particularly to a seat belt attachment assembly having covers with retention features.

BACKGROUND

Seatbelt restraint systems for restraining occupants in vehicle seats play an important role in reducing injuries in vehicle crash situations. Seat belt restraint systems of the typical 3-point variety have a lap belt section and a shoulder belt section which are connected together at one end. A latch plate (or tongue) which is releasably fixed to a buckle allows the vehicle occupant to fasten and unfasten the belt system. When the buckle and the latch plate are fastened together, the seat belt restraint system restrains movement of the occupant during a collision.

OEM motor vehicle manufacturers often incorporate pretensioning devices as part of the belt restraint system, which tension the seat belt prior to or during a vehicle impact. By reducing slack in the belts, early coupling between the occupant, belt system, and vehicle structure is provided which can reduce occupant loading and excursion (displacement). One type of pretensioning device is called a pyrotechnic lap pretensioner (PLP). Various designs are known, including a type of PLP which uses a cable to connect a piston at one end to seatbelt webbing at the other end. When a collision occurs, a pyrotechnic charge is fired, producing gas which pressurizes a gas chamber within a tube, forcing the piston down the tube. Since the seatbelt webbing is connected to the piston via the cable, the seatbelt is pulled with travel of the piston, tightening the belt around the occupant.

In one design for a seatbelt system using a PLP, the PLP device is mounted to the vehicle structure, such as to a seat or floor pan, and includes a cable extending along the side of the seat occupant. In order to facilitate assembly of the seatbelt system during vehicle manufacturing, a buckle is used to fasten the PLP to the belt system. This buckle attached at the PLP may be a so-called "fixing" type which is intended to be engaged and disengaged during vehicle assembly and disassembly, and not as the primary means for fastening and unfastening the belt system by the seat occupant during use. For that purpose, a separate latching buckle is provided. Seat belt buckles, for aesthetic reasons and for protection of internal components, include covers typically formed of plastic which encase the internal mechanisms.

During a vehicle impact event in which the PLP is activated, extreme forces are placed on all seatbelt system components. It is important that loose parts are not created during the vehicle impact situation by the restraint system. Loose objects can become hazards to vehicle occupants, particularly when traveling at high velocities within the vehicle compartment. The covers used for encasing the buckle benefit by having features which prevent them from becoming detached during PLP activation.

The present invention is related to a design of holding covers for a buckle which aids in their retention during a PLP actuation. The features include forming the holding covers in a clam-shell-type construction with first and second housing halves. The housing halves snap-fit together and form a tongue passageway for receiving the tongue and have sections which circumscribe the passageway such that upon insertion of the tongue, the cover halves are interlocked together. The covers further have portions which wrap around a slot formed by the buckle for receiving the belt webbing. By wrapping the webbing around the slot such that the holding covers are inside the loop formed by the webbing, an additional retention feature is provided.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 4 is a cross-sectional view of the fixing buckle assembly of this invention; and FIG. 5 is an enlarged partial cross-sectional view showing the PLP end of the buckle assembly.

DETAILED DESCRIPTION OF THE INVENTION

Figure 1:
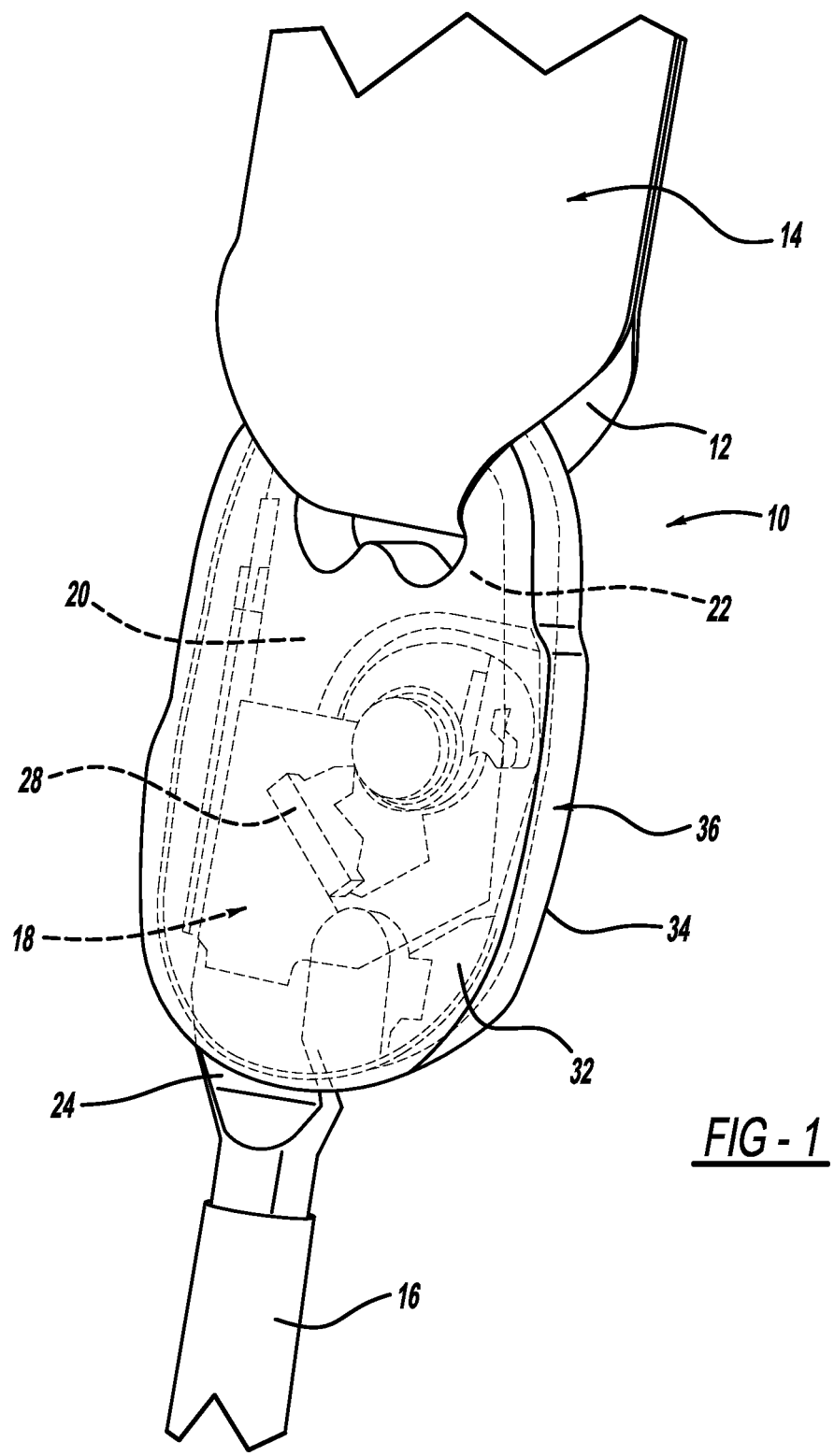
FIG. 1 is a pictorial view of fixing buckle assembly in accordance with this invention shown with an attached webbing loop and a PLP cable.
Figure 2:
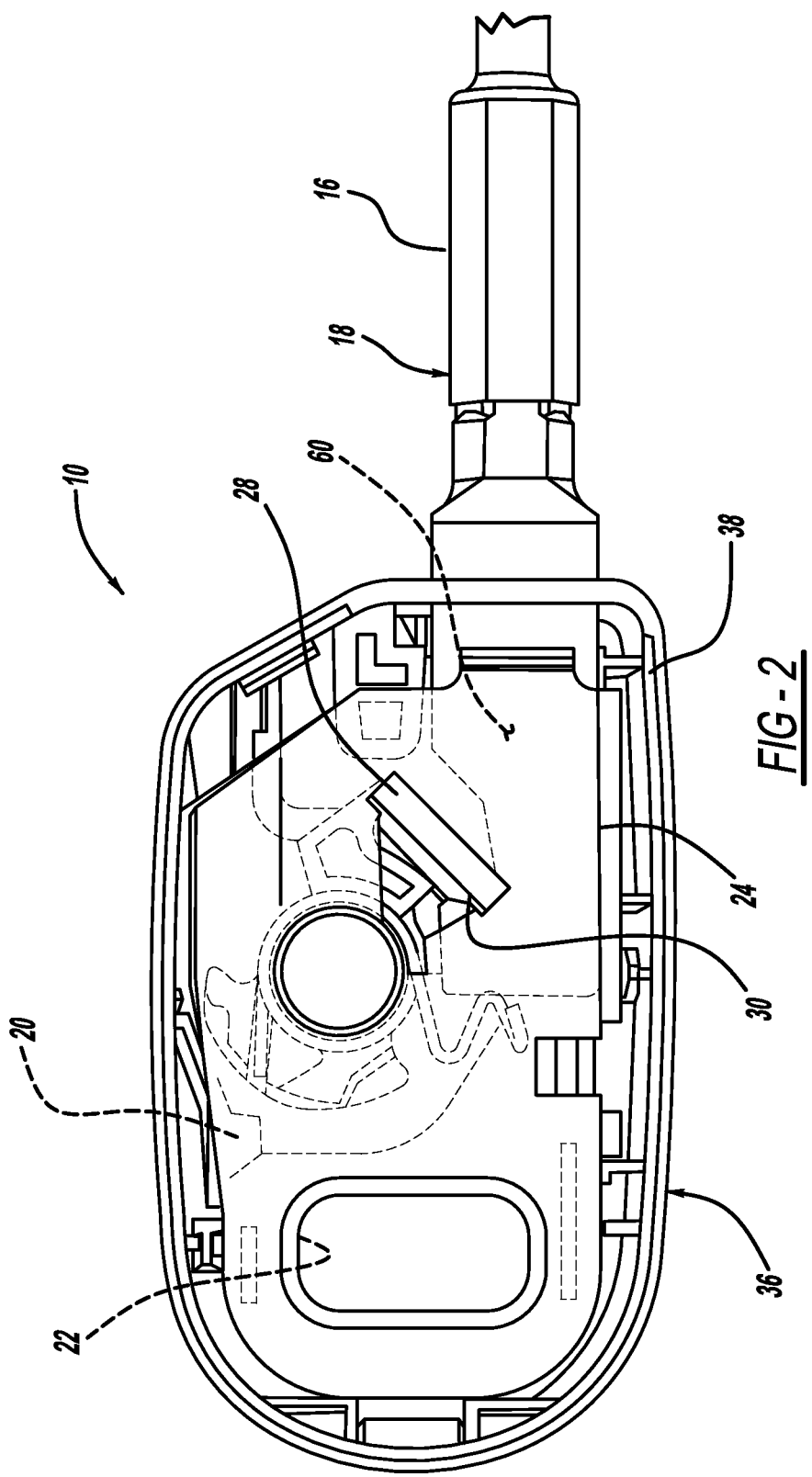
FIG. 2 is a plan view of the fixing buckle assembly with internal components illustrated by phantom lines.

A fixing buckle assembly 10 in accordance with this invention is shown in FIG. 1 in an assembled condition. Buckle assembly 10 is shown connected at its upper end to a webbing loop 12 formed by sewing an end of webbing 14 onto itself. At the lower end of the assembly a pyrotechnic lap pretensioner (PLP) cable end 16 forming buckle tongue 18 is shown inserted into the buckle assembly 10.

Webbing 14 forms part of a motor vehicle passenger belt restraint system. This could be a typical belt restraint system of the so-called three-point variety. Webbing loop 12 forms a permanent attachment of that end of webbing 14 to buckle assembly 10. For typical three-point belt restraint systems, fixing buckle assembly 10 would be mounted at the outboard locations of the driver and front seat passenger seats. In accordance with well-known principles of PLP operation, upon their activation, cable end 16 is forcibly retracted to tension the associated belt restraint system.

Fixing buckle assembly 10 may be of a type which is not used for the purposes of fastening and unfastening the restraint system by the occupant during ordinary use. During the assembly sequence of a motor vehicle, it may be preferable to separately mount the PLP unit to the vehicle structure and separately assemble the remaining components of the belt restraint system to the vehicle, such as the various anchorages, belt retractors, guide loops, and other components. During such assembly, PLP cable end 16 is joined to fixing buckle assembly 10. Buckle assembly 10 can be disconnected from tongue 18 if desired for fastening and unfastening the belt assembly, but as mentioned previously, this is not the intended application of this described embodiment of the invention.

The buckle assembly 10 includes a number of internal components. Buckle plate 20 is one of the principal structure components of the buckle assembly 10 and forms at its upper end as shown in FIG. 1, slot 22, which forms an aperture for receiving webbing loop 12. Buckle plate 20 is preferably formed from a stamped sheet metal blank.

PLP cable end 16 as shown is a cable ferrule which is attached to a braided metal cable (not shown) which is coupled with the PLP (not shown). Tongue 18 includes a flat male section 24 forming hook 26. Latch element 28 is mounted to buckle plate 20 and includes tab 30 which engages with tongue hook 26, for affixing tongue 18 to the other components of buckle assembly 10. The design of the internal components of the buckle 10 for latching buckle plate 20 to tongue 18 may be of various configurations and only one such design is described herein.

Figure 3:
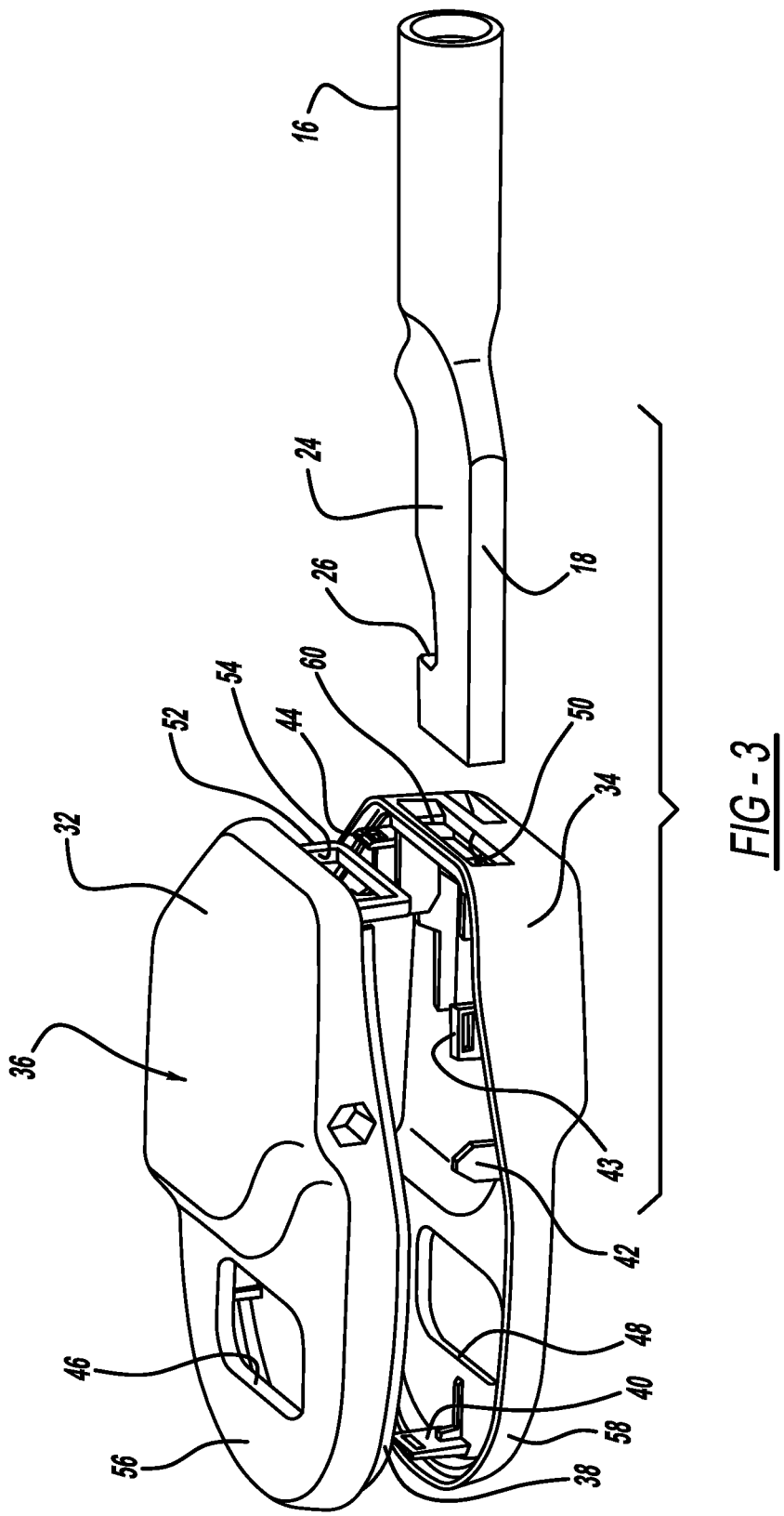
FIG. 3 is a partially exploded pictorial view of the fixing buckle assembly shown in FIG. 1 without the webbing loop or internal components of the buckle assembly.

Now with reference to FIG. 3, a pair of cover halves 32 and 34 is shown, which together comprise cover assembly 36 which encases the internal components of buckle assembly 10. As shown in FIG. 3, cover halves 32 and 34 are roughly joined at a mid-plane area and are preferably snap-fit together to provide a clam-shell type assembly. Cover half 32 includes a perimeter lip 38 which interfits with the edge of cover half 34. Upstanding tabs 40, 42, 43, and 44 of cover half 34 are provided which are received in corresponding sockets (not shown) of cover half 32 to provide a snap-fit connection between cover halves 32 and 34. Cover halves 32 and 34 respectively form apertures 46 and 48 aligned with buckle plate slot 22. When assembled together, cover assembly 36 encases buckle plate 20 and latch element 28.

Continuing with reference to FIG. 3, cover half 34, shown as a lower cover half in that Figure, forms opening 50 which provides clearance for tongue passageway 60 for receiving tongue 18. Opening 50 circumscribes tongue passageway 60. Projecting downwardly from cover half 32 is loop 52 which forms opening 54 which similarly circumscribes tongue passageway 60. When cover halves 32 and 34 are assembled, cover half 34 opening 50 is formed on the outside surface of cover assembly 36. FIG. 4 shows that loop 52 and the surface of cover 34 forming opening 50 are axially displaced along tongue passageway 60 and interfit with one another. As shown in FIG. 4, the presence of tongue 18 within tongue passageway 60 causes both cover halves 32 and 34 to become interlocked together since both opening 50 and loop 52 completely encircle tongue 18. The arrows of FIG. 5 shows forces which can act on cover halves 32 and 34 upon the activation of the PLP. Since both covers 32 and 34 have sections which circumscribe tongue passageway 60, they are retained from separating and thus maintain their assembled condition in response to the external forces.

FIG. 4 further shows that cover halves 32 and 34 each form sections 56 and 58 extending from apertures 46 and 48 respectively to the end of the cover assembly 36 opposite the end forming tongue passageway 60 closely fit against buckle plate 20. As shown in FIG. 4, webbing loop 12 is sewn in a manner surrounding and wrapping around the outside of cover sections 56 and 58. The arrows at the left hand portion of FIG. 4 show by arrows, potential forces acting to separate cover halves 32 and 34 during activation of the PLP. Since webbing loop 12 completely encircles sections 56 and 58, they are restrained from becoming detached from the remainder of buckle assembly 10.

Cover halves 32 and 34 are preferably formed each as one-piece injection molded parts made from a polymer resin material. Each integrally forms the various features mentioned previously, including tabs 40, 42, 43, and 44, as well as loop 52 and openings 54, and sections 56 and 58.

It is within the scope of the present invention to reverse the configuration shown and have the PLP end affixed to buckle assembly 10 via a loop which wraps through slot 22. In such a configuration, belt webbing 14 could be affixed to tongue 18.

While the above description constitutes the preferred embodiment of the present invention, it will be appreciated that the invention is susceptible to modification, variation and change without departing from the proper scope and fair meaning of the accompanying claims.

The invention claimed is:

1. A fixing buckle assembly for a motor vehicle seat belt restraint system of a type having a webbing for positioning on an occupant and a lap pretensioner for pretensioning the webbing upon an anticipated or an actual occurrence of an impact of the motor vehicle, the buckle assembly comprising:
a tongue affixed to one of the webbing or a connecting strap of the lap pretensioner,
a buckle plate affixed to the other of the webbing or the connecting strap, the buckle plate forming a slot for receiving a loop of the webbing or the connecting strap, the tongue and the buckle plate being attachable together,
a cover assembly for encasing the buckle plate, the cover assembly having a first cover half and a second cover half attachable together, the first and the second cover halves cooperating to form a tongue passageway for receiving the tongue, the first and the second cover halves each further forming sections which circumscribe the tongue passageway wherein upon assembly of the first and the second cover halves and insertion of the tongue, the first and the second cover halves are interlocked together by the tongue, and
the first and the second cover halves further having portions proximate the buckle plate slot which are wrapped around by the loop of the webbing strap or the connecting strap, the first and the second cover half sections and the portions retaining the first and the second cover halves in an assembled condition upon activation of the lap pretensioner.

2. A fixing buckle assembly according to claim 1 further comprising the tongue for being affixed to the lap pretensioner and the buckle plate slot for receiving the webbing loop.

3. A fixing buckle assembly according to claim 1 further comprising the first and the second cover halves being snap-fit together.

4. A fixing buckle assembly according to claim 1 further comprising the first cover half section circumscribing the tongue passageway forming an external surface of the cover assembly surrounding the tongue passageway, and the second housing half section circumscribing the tongue passageway form a housing loop.

5. A fixing buckle assembly according to claim 4 further comprising the first and the second housing half sections circumscribing the tongue passageway are axially staggered along the tongue passageway.

6. A fixing buckle assembly according to claim 1 further comprising the first and the second housing half sections each formed as one-piece molded parts of a polymeric resin material.

7. A fixing buckle assembly for a motor vehicle seat belt restraint system of a type having a webbing for positioning on an occupant and a lap pretensioner for pretensioning the seat belt restraint system upon an anticipated or an actual occurrence of an impact of the motor vehicle, the buckle assembly comprising:
a tongue affixed to a connecting strap of the lap pretensioner, a buckle plate affixed to the webbing, the buckle plate forming a slot for receiving a loop of the webbing, the tongue and the buckle plate being attachable together, a cover assembly for encasing the buckle plate, the cover assembly having a first cover half and a second cover half attachable together, the first and the second cover halves cooperating to form a tongue passageway for receiving the tongue, the first and the second cover halves each further forming sections which circumscribe the tongue passageway wherein upon assembly of the first and the second cover halves and insertion of the tongue, the first and the second cover halves are interlocked together by the tongue, and the first and the second cover halves further having portions proximate the buckle plate slot which are wrapped around by the loop of the webbing strap or the connecting strap, the first and the second cover half sections and the portions retaining the first and the second cover halves in an assembled condition upon activation of the lap pretensioner.

8. A fixing buckle assembly according to claim 7 further comprising the first and the second cover halves being snap-fit together.

9. A fixing buckle assembly according to claim 7 further comprising the first cover half section circumscribing the tongue passageway forming an external surface of the cover assembly surrounding the tongue passageway, and the second cover half section circumscribing the tongue passageway form a housing loop.

10. A fixing buckle assembly according to claim 9 further comprising the first and the second housing half sections circumscribing the tongue passageway are axially staggered along the tongue passageway.

11. A fixing buckle assembly according to claim 7 further comprising the first and the second housing half sections each formed as one-piece molded parts of a polymeric resin material.

* * * * *